(12) United States Patent
Sedayao et al.

(10) Patent No.: US 9,348,840 B2
(45) Date of Patent: May 24, 2016

(54) ADAPTIVE DATA STRIPING AND REPLICATION ACROSS MULTIPLE STORAGE CLOUDS FOR HIGH AVAILABILITY AND PERFORMANCE

(71) Applicant: Intel Corporation, Santa Clara, CA (US)

(72) Inventors: Jeffrey C. Sedayao, San Jose, CA (US); Sudip S. Chahal, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/715,241

(22) Filed: Dec. 14, 2012

(65) Prior Publication Data

US 2014/0172929 A1 Jun. 19, 2014

(51) Int. Cl.
*G06F 17/30* (2006.01)

(52) U.S. Cl.
CPC .................. *G06F 17/30212* (2013.01)

(58) Field of Classification Search
CPC .......... G06F 17/3007; G06F 17/30091; G06F 17/30094; G06F 17/30115; G06F 17/30135; G06F 17/30194; G06F 17/30197; G06F 17/30212
USPC .......... 707/640, 644, 652, 693, 821, 828, 827
See application file for complete search history.

(56) References Cited

U.S. PATENT DOCUMENTS

| | | | | |
|---|---|---|---|---|
| 5,873,101 | A * | 2/1999 | Klein | 707/640 |
| 2002/0133491 | A1* | 9/2002 | Sim et al. | 707/10 |
| 2005/0010620 | A1* | 1/2005 | Silvers et al. | 707/205 |
| 2010/0332479 | A1* | 12/2010 | Prahlad et al. | 707/741 |
| 2012/0130781 | A1 | 5/2012 | Li | |
| 2012/0158578 | A1 | 6/2012 | Sedayao et al. | |
| 2013/0054536 | A1* | 2/2013 | Sengupta et al. | 707/654 |
| 2013/0204849 | A1* | 8/2013 | Chacko | 707/692 |
| 2013/0227047 | A1* | 8/2013 | Dolce et al. | 709/213 |
| 2014/0173089 | A1 | 6/2014 | Li et al. | |

OTHER PUBLICATIONS

Jaatun et al., "The design of a redundant array of independent net-storages for improved confidentiality in cloud computing", Journal of Cloud Computing, Jul. 2012. download: http://www.journalofcloudcomputing.com/content/1/1/13.*

Wikipedia, "Apache Hadoop," retrieved from <http://en.wikipedia.org/w/index.php?title=Apache_Hadoop&oldid=520334841>, last modified Oct. 28, 2012, 11 pages.

(Continued)

*Primary Examiner* — Hares Jami

(74) *Attorney, Agent, or Firm* — Barnes & Thornburg LLP

(57) ABSTRACT

Technologies for adaptively striping data across multiple storage clouds include receiving user constraints corresponding one or more cloud storage providers, receiving a file to be striped across the cloud storage providers, splitting the received file into file blocks, allocating each of the file blocks to a different one of the cloud storage providers as a function of the user constraints and operating conditions of each of the cloud storage providers, and sending each of the file blocks to the cloud storage provider to which each file block is allocated. In some embodiments, file blocks may be re-allocated from one cloud storage provider to another cloud storage provider as a function of changing user constraints or operating conditions. In addition, each of the file blocks may be retrieved from the cloud storage providers to re-assemble the file.

10 Claims, 7 Drawing Sheets

(56) References Cited

OTHER PUBLICATIONS

Wikipedia, "Google File System," retrieved from <http://en.wikipedia.org/w/index.php?title=Google_File_System&oldid=513743952>, last modified Sep. 20, 2012, 3 pages.

Wikipedia, "IBM General Parallel File System," retrieved from <http://en.wikipedia.org/w/index.php?title=IBM_General_Parallel_File_System&oldid=512221253>, last modified Sep. 13, 2012, 4 pages.

Li et al., "Cloud Data Storage Location Monitoring" U.S. Appl. No. 13/715,287, Dec. 14, 2012, 32 pages.

"Enterprise service bus," Wikipedia, The Free Encyclopedia, retrieved from: <http://en.wikipedia.org/w/index.php?title=Enterprise_service_bus&oldid=500611143>, edited Jul. 4, 2012, 6 pages.

"Cloud computing," Wikipedia, The Free Encyclopedia, retrieved from: <http://en.wikipedia.org/w/index.php?title=Cloud_computing&oldid=487761996>, edited Apr. 17, 2012, 10 pages.

"Cloud storage," Wikipedia, The Free Encyclopedia, retrieved from: <http://en.wikipedia.org/w/index.php?title=Cloud_storage&oldid=486347196>, edited Apr. 9, 2012, 4 pages.

"Distributed data store," Wikipedia, The Free Encyclopedia, retrieved from: <http://en.wikipedia.org/w/index.php?title=Distributed_data_store&oldid=485131637>, edited Apr. 2, 2012, 3 pages.

"Cloud storage gateway," Wikipedia, The Free Encyclopedia, retrieved from: <http://en.wikipedia.org/w/index.php?title=Cloud_storage_gateway&oldid=484422424>, edited Mar. 28, 2012, 1 page.

* cited by examiner

ADAPTIVE DATA STRIPING AND REPLICATION ACROSS MULTIPLE STORAGE CLOUDS FOR HIGH AVAILABILITY AND PERFORMANCE

BACKGROUND

Cloud computing is a ubiquitous tool by which virtual computing resources and services are provided to subscribers and other entities. Cloud computing can offer many advantages to a subscriber including relatively quick, efficient, and inexpensive upgradability and scalability of computing resources as the needs of the subscriber changes over time. In cloud computing, infrastructure, platform, and/or software may be provided by a cloud computing provider to the subscriber as a "service" over a network (i.e., over the "cloud"). For example, rather than having independent software packages loaded on each of the subscriber's computer devices, the software may be provided to the subscriber as a service accessible by any of the subscriber's computing devices using a web browser or associated lightweight application.

The online storage of data is an increasingly popular service being offered by many cloud computing providers (i.e., "cloud storage providers"). Such cloud storage providers typically allocate a certain amount of online data storage to which data (e.g., files, digital documents, digital photographs, digital music, system backups, virtual machine images, etc.) may be stored and later accessed. The amount of data storage available to a subscriber is typically based on a fee structure set by each cloud storage provider. Therefore, as the subscriber's storage needs grow, the amount of data storage available may be increased for an additional fee.

Each cloud storage provider typically manages one or more data centers, which facilitate storage and retrieval of data uploaded by a subscriber. To improve responsiveness and availability of the data uploaded by a subscriber, a cloud storage provider may replicate entire files or portions of files across multiple computing resources of the one or more data centers managed by that cloud storage provider. As a result, however, the data uploaded by the subscriber to one cloud storage provider is not typically accessible by the subscriber using another cloud storage provider.

Due to the increasing popularity of online storage services, many cloud storage providers exists. In selecting a particular cloud storage provider, a subscriber typically weighs a variety of factors associated with each cloud storage provider. For example, to control the costs of online storage, the subscriber may choose to subscribe to one cloud storage provider over another based on the fee structure set by each of the cloud storage providers. The subscriber may also choose to subscribe to one cloud storage provider over another based on the availability or performance of each of the cloud storage providers. Additionally, it is not uncommon for the subscriber to subscribe to multiple cloud storage providers based on one or more of those factors.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
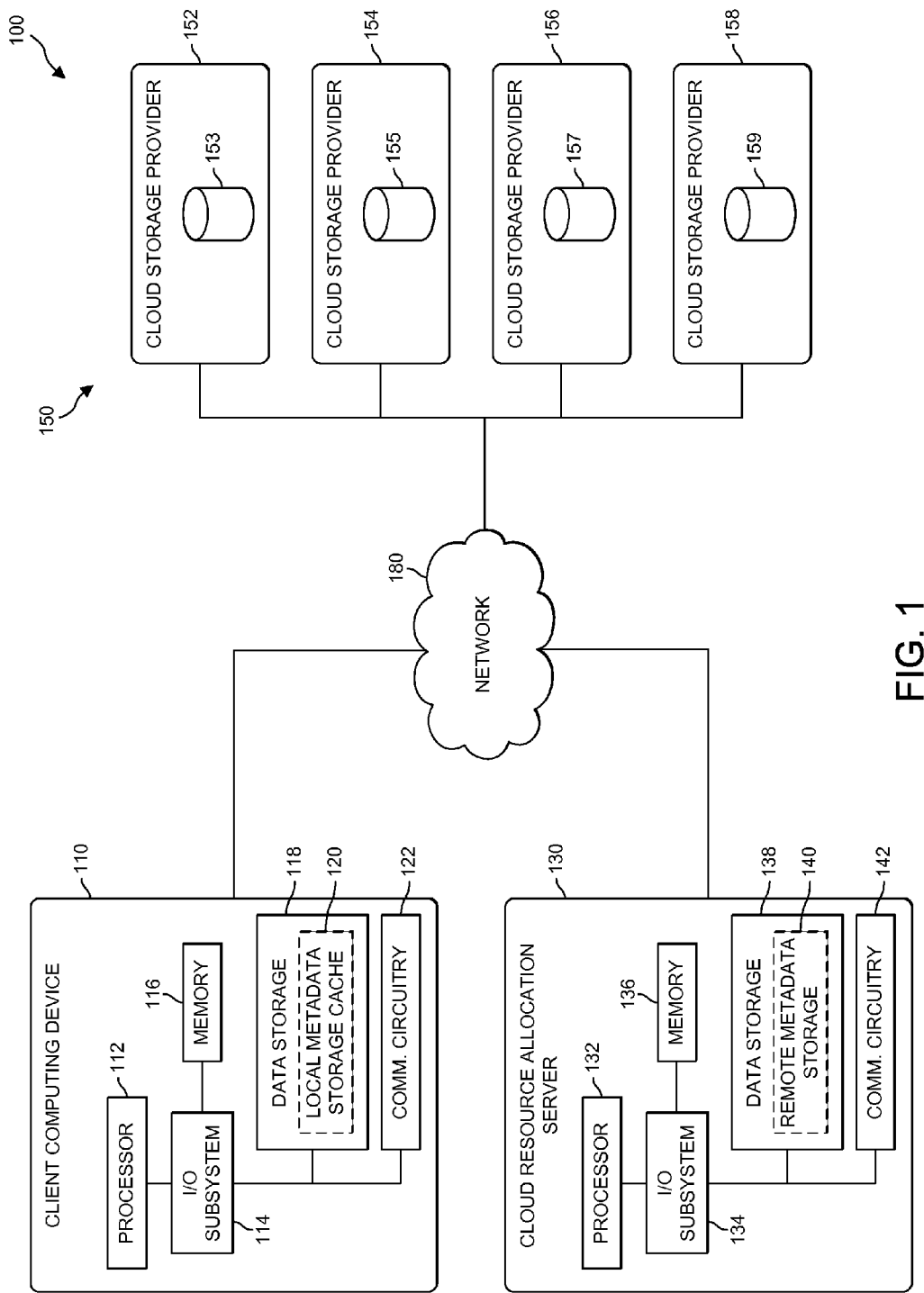
FIG. 1 is a simplified block diagram of at least one embodiment of a system for using a cloud resource allocation server to adaptively stripe and replicate data across multiple storage clouds to provide high availability and performance.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for adaptively striping and replicating data across multiple storage clouds to provide high availability and performance includes a client computing device 110, a cloud resource allocation server 130, and one more cloud storage providers 150, which are capable of bi-directional communication with each other as discussed in more detail below. In use, the cloud resource allocation server 130 is configured to receive one or more files from the client computing device 110, split each file into one or more file blocks, and stripe the file blocks across the one or more cloud storage providers 150. In some embodiments, the cloud resource allocation server 130 allocates the file blocks to different ones of the one or more cloud storage providers 150 (e.g., the cloud storage providers 152, 154, 156, 158) based on, or otherwise as a function of, user constraints received from the client computing device 110 and/or the operating conditions of each of the one or more cloud storage providers 150. Each file block may then be saved to the cloud storage provider 152, 154, 156, 158 to which it was allocated.

To access a particular file, the client computing device 110 may retrieve the corresponding file blocks from the one or more cloud storage providers 150 (e.g., the cloud storage providers 152, 154, 156, 158) to which they were allocated. That is, each file block of the file to be accessed may be retrieved from the cloud storage provider 152, 154, 156, and/or 158 to which it was stored. In some embodiments, the client computing device 110 may include information indicative of the location where each of the one or more file blocks is stored. That is, the client computing device 110 may include information (e.g., location metadata) indicative of which of the one or more cloud storage providers 150 each file block is stored. Additionally or alternatively, the client computing device 110 may request the location metadata for one or more file blocks if unknown.

In some embodiments, the cloud resource allocation server 130 may monitor for changes to the operating conditions of each of the cloud storage providers 150 to which file blocks are stored. In response to determining that the operating conditions of one of the cloud storage providers 150 (e.g., the cloud storage provider 152) have changed, the cloud resource allocation server 130 may determine, based on the user constraints, whether to dynamically re-allocate the file blocks stored on that cloud storage provider 152 to another one of the cloud storage providers 150 (e.g., the cloud storage provider 154). In some embodiments, the cloud resource allocation server 130 may also monitor for changes to the user constraints. In response to detecting such a change, the cloud resource allocation server 130 may determine, based on the changes to the user constraints, whether to dynamically re-allocate file blocks stored on one of the cloud storage providers 150 (e.g., the cloud storage provider 152) to another one of the cloud storage providers 150 (e.g., the cloud storage provider 154). In that way, the cloud resource allocation server 130 may leverage multiple cloud storage providers 150 to dynamically adapt to changing operating conditions and/or user constraints.

In contrast, in typical cloud storage providers 150, the location of a user's (e.g., a subscriber's) files is static in nature. That is, a user's file is typically maintained by the same cloud storage provider 150 to which the file was originally uploaded. As a result, typical cloud storage providers 150 require users to manually re-allocate data from one cloud storage provider 150 (e.g., the cloud storage provider 152) to another one of the cloud storage providers 150 (e.g., the cloud storage provider 154) in response to changing operating conditions and/or user constraints.

The cloud resource allocation server 130 may be embodied as any type of server or computing device capable of performing the functions described herein. Although only one cloud resource allocation server 130 is shown in FIG. 1, it should be appreciated that the system 100 may include any number of (e.g., multiple) cloud resource allocation servers 130 in other embodiments. As shown in FIG. 1, the illustrative cloud resource allocation server 130 includes a processor 132, a memory 136, an input/output subsystem 134, a data storage 138, and communication circuitry 142. Of course, the cloud resource allocation server 130 may include other or additional components, such as those commonly found in a server and/or computer (e.g., various input/output devices), in other embodiments. Additionally, in some embodiments, one or more of the illustrative components may be incorporated in, or otherwise from a portion of, another component. For example, the memory 136, or portions thereof, may be incorporated in the processor 132 in some embodiments.

The processor 132 may be embodied as any type of processor capable of performing the functions described herein. For example, the processor 132 may be embodied as a single or multi-core processor(s), digital signal processor, microcontroller, or other processor or processing/controlling circuit. Similarly, the memory 136 may be embodied as any type of volatile or non-volatile memory or data storage capable of performing the functions described herein. In operation, the memory 136 may store various data and software used during operation of the cloud resource allocation server 130 such as operating systems, applications, programs, libraries, and drivers. The memory 136 is communicatively coupled to the processor 132 via the I/O subsystem 134, which may be embodied as circuitry and/or components to facilitate input/output operations with the processor 132, the memory 136, and other components of the cloud resource allocation server 130. For example, the I/O subsystem 134 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 134 may form a portion of a system-on-a-chip (SoC) and be incorporated, along with the processor 132, the memory 136, and other components of the cloud resource allocation server 130, on a single integrated circuit chip.

The communication circuitry 142 of the cloud resource allocation server 130 may be embodied as any communication circuit, device, or collection thereof, capable of enabling communications between the cloud resource allocation server 130, the client computing device 110, the one or more cloud storage providers 150, and/or other computing devices. The communication circuitry 142 may be configured to use any one or more communication technology (e.g., wireless or wired communications) and associated protocols (e.g., Ethernet, WiFi®, WiMAX, etc.) to effect such communication. In some embodiments, the cloud resource allocation server 130, the client computing device 110, and/or the one or more cloud storage providers 150 may communicate with each other over a network 180. The network 180 may be embodied as any number of various wired and/or wireless communication networks. For example, the network 180 may be embodied as or otherwise include a local area network (LAN), a wide area network (WAN), a cellular network, or a publicly-accessible, global network such as the Internet. Additionally, the network 180 may include any number of additional devices to facilitate communication between the cloud resource allocation server 130, the client computing device 110, the one or more cloud storage providers 150, and/or the other computing devices.

The data storage 138 may be embodied as any type of device or devices configured for short-term or long-term storage of data such as, for example, memory devices and circuits, memory cards, hard disk drives, solid-state drives, or other data storage devices. In the illustrative embodiment, the data storage 138 may include a remote metadata storage 140. As discussed in more detail below, the cloud resource allocation server 130 may maintain location metadata in the remote metadata storage 140 indicative of which file blocks are stored on which of the cloud storage providers 150. Of course, in other embodiments, the cloud resource allocation server 130 may maintain additional or other types of data in the data storage 138.

The client computing device 110 may be embodied as any type of computing device capable of performing the functions described herein including, but not limited to, a mobile phone, a smart phone, a tablet computing device, a personal digital assistant, a messaging device, a consumer electronic device, a handset, a laptop computer, a desktop computer, a server, and/or any other computing device. The illustrative client computing device 110 includes a processor 112, a memory 116, an input/output subsystem 114, a data storage 118, and communication circuitry 122. Those components of the client computing device 110 may be similar to the corresponding components of the cloud resource allocation server 130, the description of which is applicable to the corresponding components of the client computing device 110 and is not repeated herein for clarity of the description. In the illustrative embodiment, the client computing device 110 may include a local metadata storage cache 120. The client computing device 110 may maintain local versions of the location metadata in the local metadata storage cache 120. As discussed in more detail below, the local versions of the location metadata stored in the local metadata storage cache 120 may correspond to the location metadata stored in the remote metadata storage 140 of the cloud resource allocation server 130. It should, however, be understood that in embodiments wherein the cloud resource allocation server 130 dynamically re-allocates one or more file blocks between the cloud storage providers 150, the local versions of the location metadata stored in the local metadata storage cache 120 may be outdated compared to the location metadata stored in the remote metadata storage 140 of the cloud resource allocation server 130. As discussed in more detail below, the outdated versions of the location metadata stored in the local metadata storage cache 120 may be updated based on, or otherwise as a function of, updated location metadata received from the cloud resource allocation server 130. Of course, in other embodiments, the client computing device 110 may maintain additional or other types of data in the data storage 118.

The cloud storage providers 150 (e.g., the cloud storage provider 152, 154, 156, 158) may be embodied as any type of cloud computing provider that provides infrastructure, platform, and/or software as a "service" over a network (i.e., over the "cloud") to a user. As such, the cloud storage providers 150 may include devices and structures commonly found in cloud computing providers, which are not shown in FIG. 1 for clarity of the description. Each of the illustrative cloud storage providers 152, 154, 156, 158 includes data storage 153, 155, 157, 159 (e.g., one or more data storage devices) to store data for the client computing device 110. As discussed above, the client computing device 110 may first send a file to the cloud resource allocation server 130, which segments (e.g., splits) the file into one or more file blocks and stripes (e.g., allocates) those file blocks across different ones of the cloud storage providers 152, 154, 156, 158. In such embodiments, each of the file blocks may be saved to the data storage 153, 155, 157, 159 corresponding to the cloud storage provider 152, 154, 156, 158 to which the file block was allocated. It should be appreciated that although four data storages (e.g., the data storage 153, 155, 157, 159) are shown in the illustrative embodiment, any number of data storages may be utilized in other embodiments. Additionally, it should be appreciated that each of the data storages 153, 155, 157, 159 may be embodied as a single data storage, multiple data storages, or a virtualized pool of data storage.

Figure 2:
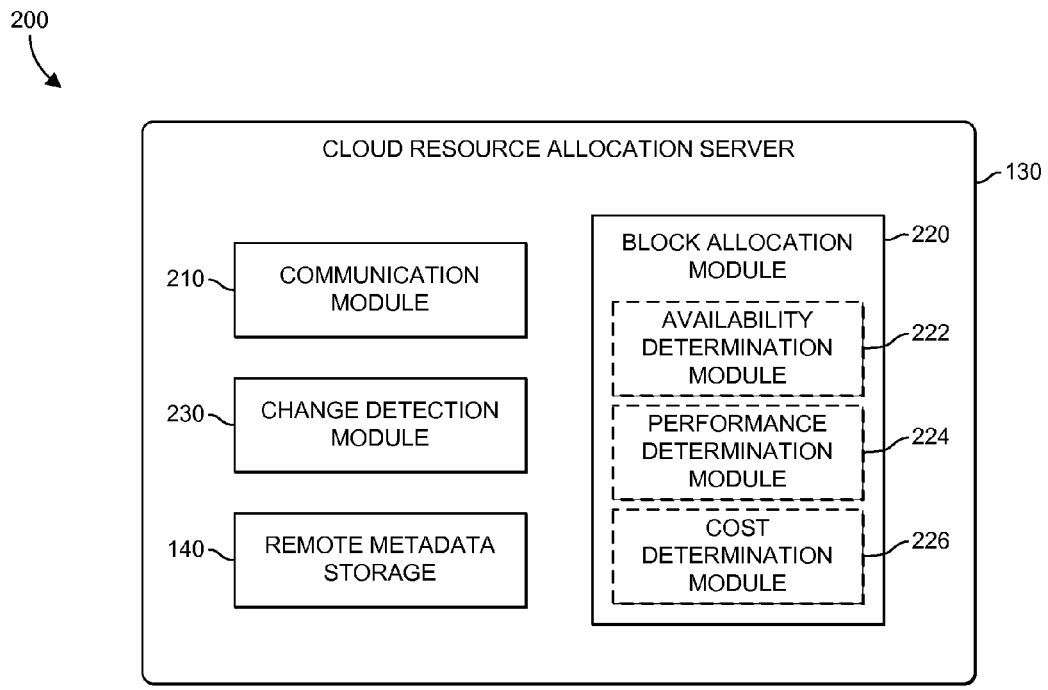
FIG. 2 is a simplified block diagram of at least one embodiment of an environment of the cloud resource allocation server of the system of FIG. 1.

Referring now to FIG. 2, in one embodiment, the cloud resource allocation server 130 establishes an environment 200 during operation. The illustrative environment 200 includes a communication module 210, a block allocation module 220, a change detection module 230, and the remote metadata storage 140. It should be appreciated that the cloud resource allocation server 130 may include other components, sub-components, modules, and devices commonly found in a server, which are not illustrated in FIG. 2 for clarity of the description.

The communication module 210 of the cloud resource allocation server 130 facilitates communications between the client computing device 110 and/or one or more cloud storage providers 150. In some embodiments, the communication module 210 receives one or more files from the client computing device 110. The communication module 210 may also receive one or more user constraints from the client computing device 110. The user constraints may define user preferences (e.g., availability preferences, performance preferences, cost preferences, etc.) for selecting which of the cloud storage providers 150 to allocate file blocks. As a function of those user constraints, the communication module 210 may transmit portions of the received files to the selected cloud storage providers 150. In some embodiments, the communication module 210 of the cloud resource allocation server 130 may receive a request for location metadata from the client computing device 110. In response, the requested location metadata may be transmitted to the client computing device 110.

The block allocation module 220 may split each of the files received from the client computing device 110 into one or more file blocks. That is, the block allocation module 220 may segment or otherwise break a received file into one or more pieces (e.g., blocks). In some embodiments, the block allocation module 220 may split each file into any number of file blocks according to the user constraints and/or reference criteria such as, for example, server settings, resource availability, user preferences, or any other criteria suitable for determining the number of blocks a received file should be broken into.

As discussed, the cloud resource allocation server 130 may also stripe file blocks across one or more of the cloud storage providers 150. To do so, block allocation module 220 may allocate each file block of a particular file to a different cloud storage provider 150 (e.g., the cloud storage provider 152, 154, 156, 158) of the one or more cloud storage providers 150. In some embodiments, the block allocation module 220 may determine which of the one or more cloud storage providers 150 to allocate file blocks to based in least in part on, or otherwise as a function of, the user constraints received from the client computing device 110. For example, in some embodiments, the block allocation module 220 may determine that a group of the cloud storage providers 150 (e.g., the cloud storage provider 152, the cloud storage provider 154, and the cloud storage provider 156) meets the user constraints (e.g., availability preferences, performance preferences, cost preferences, etc.) received from the client computing device 110 and, as a result, may determine to allocate each of those cloud storage providers 152, 154, 156 a different file block of a particular file. It should be appreciated that although the block allocation module 220 allocates a different file block of a particular file to each one of the one of one more cloud storage providers 150 meeting the user constraints in the illustrative embodiment, the block allocation module 220 may also allocate each file block to two different cloud storage providers 150 to facilitate data recovery in other embodiments. For example, in such embodiments, the block allocation module 220 may replicate the same file block on two different cloud storage providers 150.

In some embodiments, the block allocation module 220 may store location information indicative of which ones of the one or more cloud storage providers 150 each file block has been allocated. To do so, the block allocation module 220 may store the location information for each file block as metadata in the remote metadata storage 140. The location metadata may be embodied as information encoded according to one or more data formats. For example, the location metadata may be embodied as information encoded according to an Extensible Markup Language (XML) format, a HyperText Markup Language (HTML) format, a plain text format, or any other format suitable to electronically embody information describing one or more aspects of an allocated file block. In addition, in some embodiments, the block allocation module 220 may also store re-assembly information for each file as metadata in the remote metadata storage 140. In such embodiments, the re-assembly metadata is used by the client computing device 110 to re-assemble a plurality of received file blocks back into a particular file. The block allocation module 220 may also replicate, in some embodiments, the location and re-assembly metadata to another cloud resource allocation server (not shown) for backup and recovery purposes.

In some embodiments, the block allocation module 220 may include an availability determination module 222, a performance determination module 224, and a cost determination module 226. The availability determination module 222 may be configured to determine the availability of each of the one or more cloud storage providers 150. In some embodiments, the availability determination module 222 may determine that one or more of the cloud storage providers 150 are available based at least in part on communications (e.g., echo request/reply packets, heartbeat messages, logs, etc.) with the one or more of cloud storage providers 150 over the network 180. It should be understood that the availability determination module 222 may, additionally or alternatively, use any other suitable technique for determining whether one or more of the cloud storage providers 150 are available. In some embodiments, the availability determination module 222 may represent the availability of one or more of the cloud storage providers 150 as a binary digit (e.g., a numerical zero or a numerical one), a logic value (e.g., "true" or "false"), a counter value, a percentage, or any other value or metric suitable for representing the availability of one or more of the cloud storage providers 150.

The performance determination module 224 may be configured to determine a performance level of one or more of the cloud storage providers 150. To do so, the performance determination module 224 may compare the current operational levels against corresponding reference metrics. For example, in some embodiments the performance determination module 224 may measure the amount of time required for a particular cloud storage provider 150 (e.g., the cloud storage provider 152) to service a request. In such embodiments, the performance determination module 224 may compare the measured amount of time against a reference response metric to determine the current operational level of the particular cloud storage provider 150 (e.g., the cloud storage provider 152). It should be understood that while the performance determination module 224 compares a measured response time for a particular cloud storage provider 150 (e.g., the cloud storage provider 152) against a reference response metric in the illustrative embodiment, the performance determination module 224 may also measure and compare any other operational value of a particular cloud storage provider 150 (e.g., the cloud storage provider 152) against a corresponding reference metric in other embodiments. For example, in some embodiments, the performance determination module 224 may also measure and compare a network latency value or a data integrity value for the particular cloud storage provider 150 (e.g., the cloud storage provider 152).

The cost determination module 226 may determine the cost of storing one or more file blocks on each of the one or more cloud storage providers 150. As discussed, the cloud storage providers 150 typically allocate a certain amount of online data storage to which data (e.g., files, digital documents, digital photographs, digital music, system backups, virtual machine images, etc.) may be stored and later accessed. The amount of data storage available to a user is typically based on a fee structure set by each cloud storage provider 152, 154, 156, 158. Many of the cloud storage providers 150 increase the amount of storage available to the user for an additional fee. Additionally, it is not uncommon for one or more of the cloud storage providers 150 to change the base service fee over time. As a result, the cost determination module 226 may determine a cost (e.g., the current cost) associated with storing data with a particular cloud storage provider 150 (e.g., the cloud storage provider 152). In some embodiments, the cost determination module 226 may represent the cost of one or more of the cloud storage providers 150 as a currency value or any other value or metric suitable for representing the costs of using or storing data on one or more of the cloud storage providers 150.

As discussed, the block allocation module 220 may allocate each file block of a file to a different cloud storage provider 150 (e.g., the cloud storage provider 152, 154, 156, 158) of the one or more cloud storage providers 150 based in least in part on, or otherwise as a function of, the user constraints received from the client computing device 110. In such embodiments, the block allocation module 220 may compare the availability information determined by the availability determination module 222, the performance level determined by the performance determination module 224, and the cost determined by the cost determination module 226 against one or more user constraints corresponding to an availability preference, a performance preference, and a cost preference of the user.

The change detection module 230 may determine whether there has been a change to the user constraints in some embodiments. That is, the change detection module 230 may determine whether one or more of the user's availability preferences, performance preferences, and cost preferences have changed. In some embodiments, the change detection module 230 may monitor for the receipt of new and/or updated user constraints from the client computing device 110. In response to determining that new and/or updated user constraints have been received from the client computing device 110, the change detection module 230 may send a message or otherwise notify the block allocation module 220 of the change.

In some embodiments, the change detection module 230 may also determine whether there has been a change to the operating conditions of one or more of the cloud storage providers 150. To do so, the change detection module 230 may determine the current operating conditions of each of the cloud storage providers 150 based at least in part on, or otherwise as a function of, the availability information, the performance information, and the cost information determined by the availability determination module 222, the performance determination module 224, and the cost determination module 226, respectively. The change detection module 230 may then compare the current operating conditions for each of the cloud storage providers 150 with historical operating conditions. In response to determining that the operating conditions for one or more of the cloud storage providers 150 have been changed, the change detection module 230 may send a message or otherwise notify the block allocation module 220 of the changes.

In embodiments wherein the change detection module 230 notifies the block allocation module 220 that either the user constraints and/or the operating conditions of one or more of the cloud storage providers 150 have changed, the block allocation module 220 may determine whether the present allocation of file blocks across the one or more cloud storage providers 150 satisfies the user constraints. To do so, the block allocation module 220 may determine whether each cloud storage provider 150 to which file blocks are presently allocated and stored, still satisfies the user constraints (or the updated user constraints). If the block allocation module 220 determines that one or more of the cloud storage providers 150 to which file blocks are presently allocated no longer meets the users constraints, the block allocation module 220 may re-allocate the blocks from those cloud storage providers 150 to one or more cloud storage providers 150 that still do meet the user constraints. In such embodiments, the block allocation module 220 may store updated location metadata for each re-allocated file block.

Figure 3:
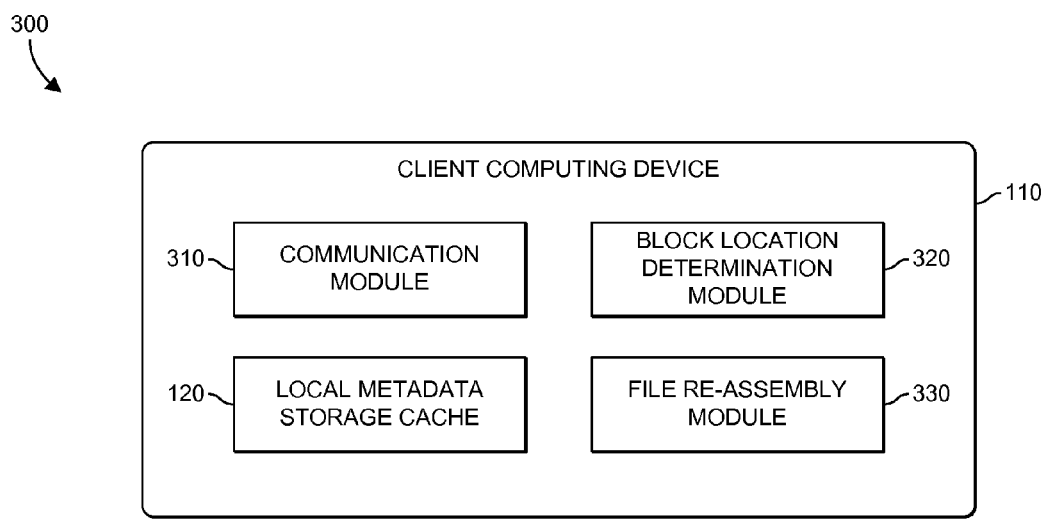
FIG. 3 is a simplified block diagram of at least one embodiment of an environment of the client computing device of the system of FIG. 1.

Referring now to FIG. 3, in one embodiment, the client computing device 110 establishes an environment 300 during operation. The illustrative environment 300 includes a communication module 310, a block location determination module 320, a file re-assembly module 330, and the local metadata storage cache 120. It should be appreciated that the client computing device 110 may include other components, sub-components, modules, and devices commonly found in a computing device, which are not illustrated in FIG. 3 for clarity of the description.

The communication module 310 of the client computing device 110 facilitates communications between the client computing device 110, the cloud resource allocation server 130, and/or one or more cloud storage providers 150. For example, the communication module 310 may send (e.g., transmit over the network 180) one or more files to the cloud resource allocation server 130, which as discussed above, splits each file into a plurality of file blocks and, based on the user constraints, stripes those file blocks across multiple cloud storage providers 150. The communication module 310 may also receive file blocks sent by one or more of the cloud storage providers 150. In some embodiments, the communication module 310 may also send one or more user constraints to the cloud resource allocation server 130.

The block location determination module 320 may determine which of the cloud storage providers 150 each file block of a particular file to be retrieved is stored. To do so, the block location determination module 320 may retrieve location metadata corresponding to each file block of the particular file to be retrieved from the local metadata storage cache 120. The location metadata for each file block identifies which of the one or more cloud storage providers 150 that particular file block is stored. After retrieving the location metadata for a particular file block, the block location determination module 320 may determine whether the particular file block is still at available at the identified one or more cloud storage providers 150. As discussed above, the block allocation module 220 of the cloud resource allocation server 130 may, in some embodiments, dynamically re-allocate one or more file blocks among cloud storage providers 150 in response to one or more of the cloud storage providers 150 no longer meeting the user constraints and/or changes in the operating conditions of one or more of the cloud storage providers 150. Therefore, the location metadata stored in the local metadata storage cache 120 for a particular file block may include outdated location information if that particular file block was re-allocated to another one of the cloud storage providers 150. In such embodiments, the block location determination module 320 may request updated location metadata for the particular file block from the cloud resource allocation server 130.

The file re-assembly module 330 may retrieve each of the file blocks of a particular file from the one or more cloud storage providers 150 identified by the location metadata retrieved from the local metadata storage cache 120 or received from the cloud resource allocation server 130. In some embodiments, the file re-assembly module 330 retrieves each file block in sequential order (e.g., one after another) from the one or more cloud storage providers 150 identified by the location metadata based on re-assembly metadata, which may retrieved from the local metadata storage cache 120 or requested from the cloud resource allocation server 130. In other embodiments, the file re-assembly module 330 contemporaneously retrieves (e.g., in parallel or at a substantially similar time) each of the file blocks from the one or more cloud storage providers 150 identified by the location metadata. Once all of the file blocks of a particular file have been retrieved, the file re-assembly module 330 re-assembles the particular file using the file blocks.

Figure 4:
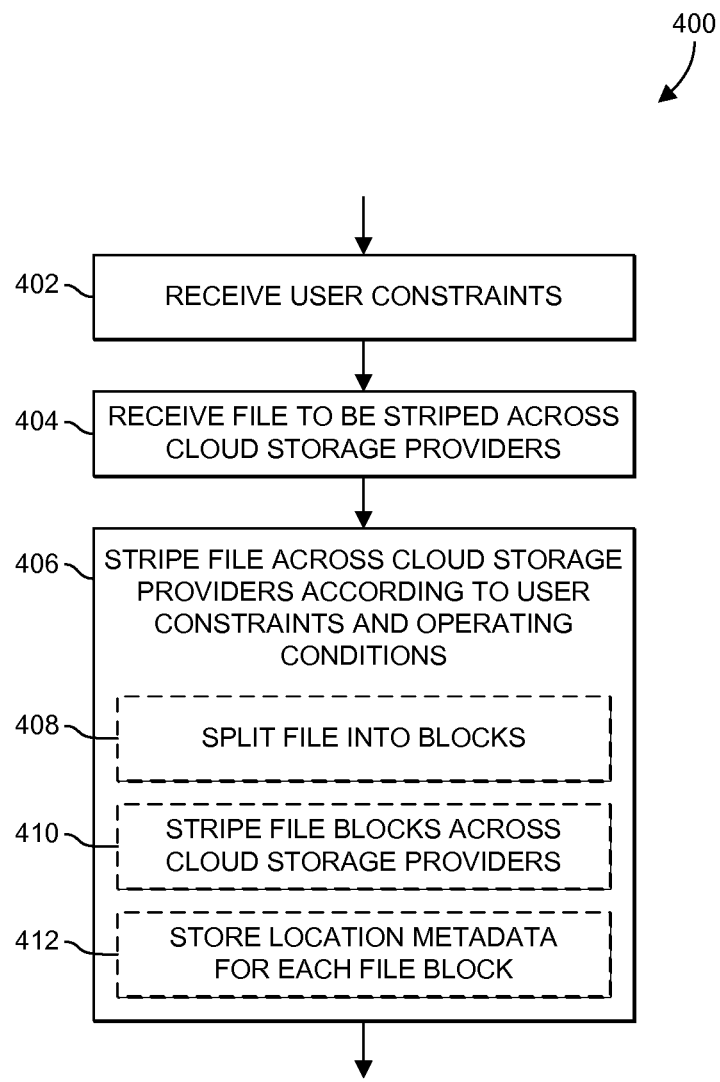
FIG. 4 is a simplified flow diagram of at least one embodiment of a method that may be executed by the cloud resource allocation server of FIGS. 1 and 2 for adaptively striping and replicating data across multiple storage clouds to provide high availability and performance.

Referring now to FIG. 4, in use, the cloud resource allocation server 130 may execute a method 400 for adaptively striping and replicating data across multiple cloud storage providers 150 to provide high availability and performance. The method 400 beings with block 402 in which the cloud resource allocation server 130 receives user constraints from the client computing device 110 in some embodiments. The user constraints received from the client computing device 110 may include new user constraints (e.g., user constraints newly received by a user of the client computing device 110) or updated user constraints (e.g., updates to user constraints previously received from the user of the client computing device 110). As discussed, the user constraints may define user preferences (e.g., availability preferences, performance preferences, cost preferences, etc.) that are utilized by the cloud resource allocation server 130 to select which of the one or more cloud storage providers 150 to allocate file blocks. For example, the user constraints may include constraints that define a reference availability threshold (e.g., a minimum amount of availability) that each of the cloud storage providers 150 must satisfy to be allocated one or more file blocks by the cloud resource allocation server 130. Additionally or alternatively, the user constraints may include constraints that define a reference performance threshold (e.g., a minimum level of performance) that each of the cloud storage providers 150 must meet. The user constraints may also include constraints that define a reference cost threshold (e.g., a maximum monetary cost) that each of the cloud storage providers 150 must satisfy to be allocated one or more file blocks by the cloud resource allocation server 130. In some embodiments, the user constraints may be first received by a user interface (UI) displayed on, for example, a display of the client computing device 110. It should be understood that in other embodiments, the client computing device 110 may include any other type of input suitable for receiving the user constraints from a user. In embodiments wherein the cloud resource allocation server 130 receives new and/or updated user constraints from the client computing device 110, the method 400 advances to block 404.

Figure 5:
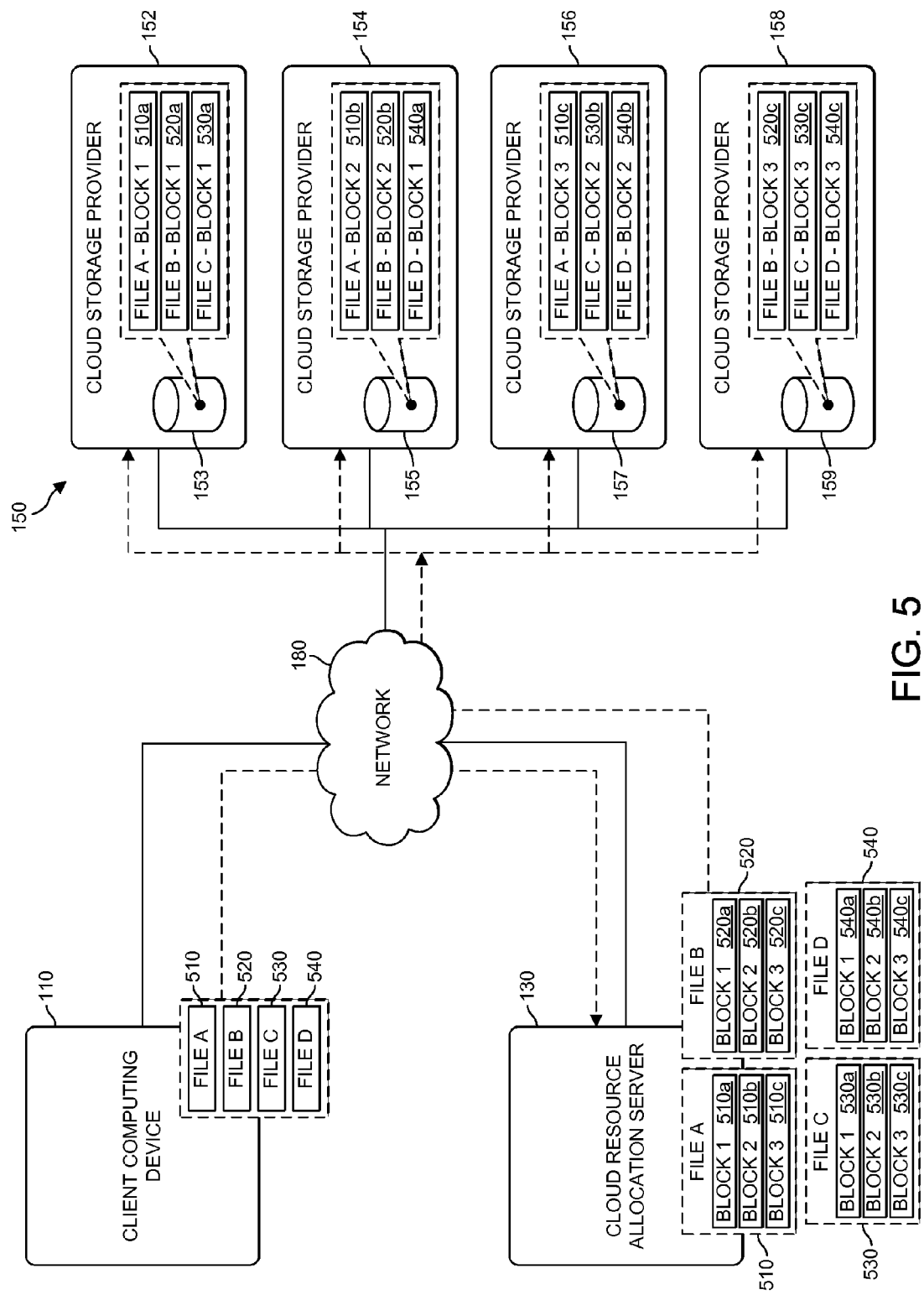
FIG. 5 is a simplified block diagram illustrating at least one embodiment of data striping of data across multiple storage clouds by executing the method of FIG. 4.

At block 404, the cloud resource allocation server 130 receives one or more data files from the client computing device 110 to be striped across one or more of the cloud storage providers 150. For example, in embodiments such as the one illustratively shown in FIG. 5, the cloud resource allocation server 130 may receive one or more files (e.g. File A 510, File B 520, File C 530, and File D 540) from the client computing device 110. It should be appreciated that although the cloud resource allocation server 130 receives four files from the client computing device 110 in the illustrative embodiment shown in FIG. 5, the cloud resource allocation server 130 may receive any number of files from the client computing device 110 in other embodiments. Referring back to FIG. 4, after receiving the one or more files (e.g. File A 510, File B 520, File C 530, and File D 540) from the client computing device 110, the method 400 advances to block 406.

At block 406, the cloud resource allocation server 130 stripes the one or more files received from the client computing device 110 across one or more of the cloud storage providers 150. At block 406, the cloud resource allocation server 130 may, in some embodiments, split or otherwise segment each of the files received from the client computing device 110 to facilitate striping the received files across one or more of the cloud storage providers 150. In such embodiments, the cloud resource allocation server 130 splits each file into any number of file blocks according to the user constraints received from the client computing device 110. For example, in embodiments such as the one illustratively shown in FIG. 5, the cloud resource allocation server 130 may split each of the file blocks (e.g., File A 510, File B 520, File C 530, and File D 540) into three file blocks. For example, in the illustrative embodiment shown, the cloud resource allocation server 130 may split File A 510 into three file blocks (e.g., File A—Block 1 510a, File A—Block 2 510b, and File A—Block 3 510c); File B 520 into three file blocks (e.g., File B—Block 1 520a, File B—Block 2 520b, and File B—Block 3 520c); File C 530 into three file blocks (e.g., File C—Block 1 530a, File C—Block 2 530b, and File C—Block 3 530c); and File D 540 into three file blocks (e.g., File D—Block 1 540a, File D—Block 2 540b, and File D—Block 3 540c). Referring back to FIG. 4, after splitting the one or more files received from the client computing device 110 into one or more file blocks, the method 400 advances to block 410.

At block 410, the cloud resource allocation server 130 allocates each of the file blocks for a particular file to one or more of the cloud storage providers 150. In some embodiments, the block allocation module 220 may determine which of the one or more cloud storage providers 150 to allocate file blocks to based in least in part on, or otherwise as a function of, the user constraints received from the client computing device 110 and/or the operating condition of each of the one or more cloud storage providers 150. For example, in the illustrative embodiment shown in FIG. 5, the cloud resource allocation server 130 may allocate one block of File A 510 (e.g., File A—Block 1 510a) to one cloud storage provider 152 in response to determining that the cloud storage provider 152 meets the user constraints (e.g., availability preferences, performance preferences, and cost preferences). In a similar manner, the cloud resource allocation server 130 may allocate another block of File A 510 (e.g., File A—Block 2 510b) to another cloud storage provider 154 in response to determining that the cloud storage provider 154 satisfies the user constraints. Yet still, the cloud resource allocation server 130 may allocate the last block of File A 510 (e.g., File A—Block 3 510c) to the cloud storage provider 156 in response to determining that the cloud storage provider 156 satisfies the user constraints. As discussed, it should be appreciated that the cloud resource allocation server 130 may split a particular file into any number of file blocks, each of which may be allocated to any number of different cloud storage providers 150. Referring back to FIG. 4, after allocating the file blocks of a particular file to one or more of the cloud storage providers 150, the method 400 advances to block 412.

At block 412, the cloud resource allocation server 130 stores location information for each file block allocated to one or more of the cloud storage providers 150. In some embodiments, the cloud resource allocation server 130 stores the location information for each file block as location metadata that identifies which of the one or more cloud storage providers 150 that particular file block is stored.

Figure 6:
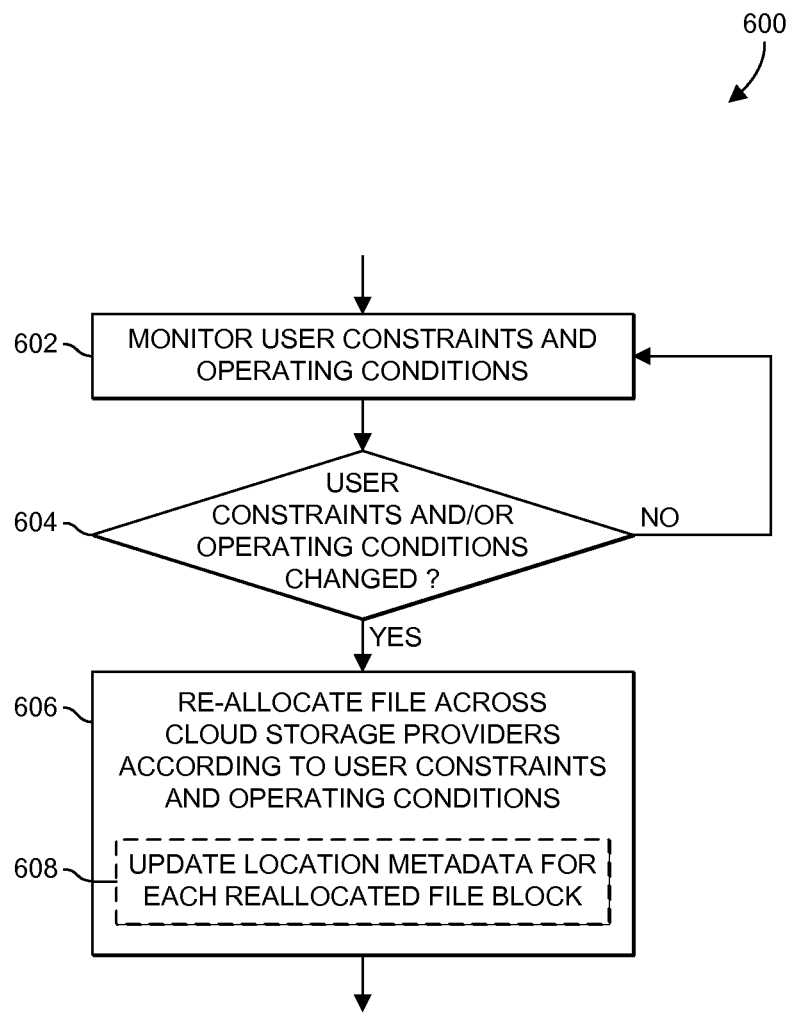
FIG. 6 is a simplified flow diagram of at least one embodiment of a method that may be executed by the cloud resource allocation server of FIGS. 1 and 2 for re-allocating data across multiple storage clouds in response to changes to user constraints or operating conditions.

Referring now to FIG. 6, in use, the cloud resource allocation server 130 may execute a method 600 for re-allocating data across multiple cloud storage providers 150 in response to changes to user constraints or operating conditions. The method 600 begins with block 602 in which the cloud resource allocation server 130 monitors the user constraints received from the client computing device 110 and the current operating conditions (e.g., the present operating conditions) of each of the one or more cloud storage providers 150. In some embodiments, to facilitate monitoring the operating conditions of each of the one or more cloud storage providers 150, the cloud resource allocation server 130 may determine a measured amount of availability, a measured performance level, and/or a total calculated monetary cost for each of the cloud storage providers 150.

At block 604, the cloud resource allocation server 130 may determine whether the user constraints and/or the operating conditions of one or more of the cloud storage providers 150 have changed. In some embodiments, the cloud resource allocation server 130 may monitor for the receipt of new and/or updated user constraints from the client computing device 110. In such embodiments, the cloud resource allocation server 130 determines that changes have been made to the user constraints. Additionally or alternatively, the cloud resource allocation server 130 may monitor for any changes to the operating conditions of one or more of the cloud storage providers 150 in some embodiments. In such embodiments, the cloud resource allocation server 130 may compare the current operating conditions (e.g., the present operating conditions) of each of the one or more cloud storage providers 150 to historical operating condition data corresponding to each cloud storage provider 150. To do so, the cloud resource allocation server 130 may compare the measured amount of availability, the measured performance level, and/or the total calculated monetary cost for each cloud storage provider 150 with historical operating condition data corresponding to each cloud storage provider 150. In such embodiments, the cloud resource allocation server 130 determines that the operating conditions for one or more of cloud storage providers 150 have changed based at least in part on, or otherwise as a function of, that comparison. If, at block 604, it is determined that either the user constraints or the operating conditions of one or more of the cloud storage providers 150 have changed, the method 600 advances to block 606. If, however, it is determined at block 604 that neither the user constraints nor the operating conditions of any of the cloud storage providers 150 have changed, the method 600 returns to block 602 and the cloud resource allocation server 130 continues monitoring the user constraints received from the client computing device 110 and the current operating conditions (e.g., the present operating conditions) of each of the one or more cloud storage providers 150.

At block 606, the cloud resource allocation server 130 may determine whether to re-allocate one or more file blocks allocated to and stored by one of the cloud storage providers 150 (e.g., the cloud storage provider 152) to another one of the cloud storage providers 150 (e.g., the cloud storage provider 158) based at least in part on, or otherwise a function of, the detected changes to the user constraints and/or the operating conditions. In some embodiments, the cloud resource allocation server 130 may determine to re-allocate one or more file blocks from one of the cloud storage providers 150 (e.g., the cloud storage provider 152) to another one of the cloud storage providers 150 (e.g., the cloud storage provider 158) in response to determining that the current operating conditions (e.g., the present operating conditions) of the one cloud storage provider 152 no longer satisfies the previously received and/or newly received user constraints from the client computing device 110. It should be understood that although the cloud resource allocation server 130 re-allocates the file blocks allocated the cloud storage provider 152 to the cloud storage provider 158 in the illustrative embodiment, the cloud resource allocation server 130 may re-allocate file blocks from any one of the cloud storage providers 150 to any of the other cloud storage providers 150 in other embodiments. At block 608, updated location metadata is stored for each re-allocated file block in some embodiments to facilitate later retrieval those file blocks.

Figure 7:
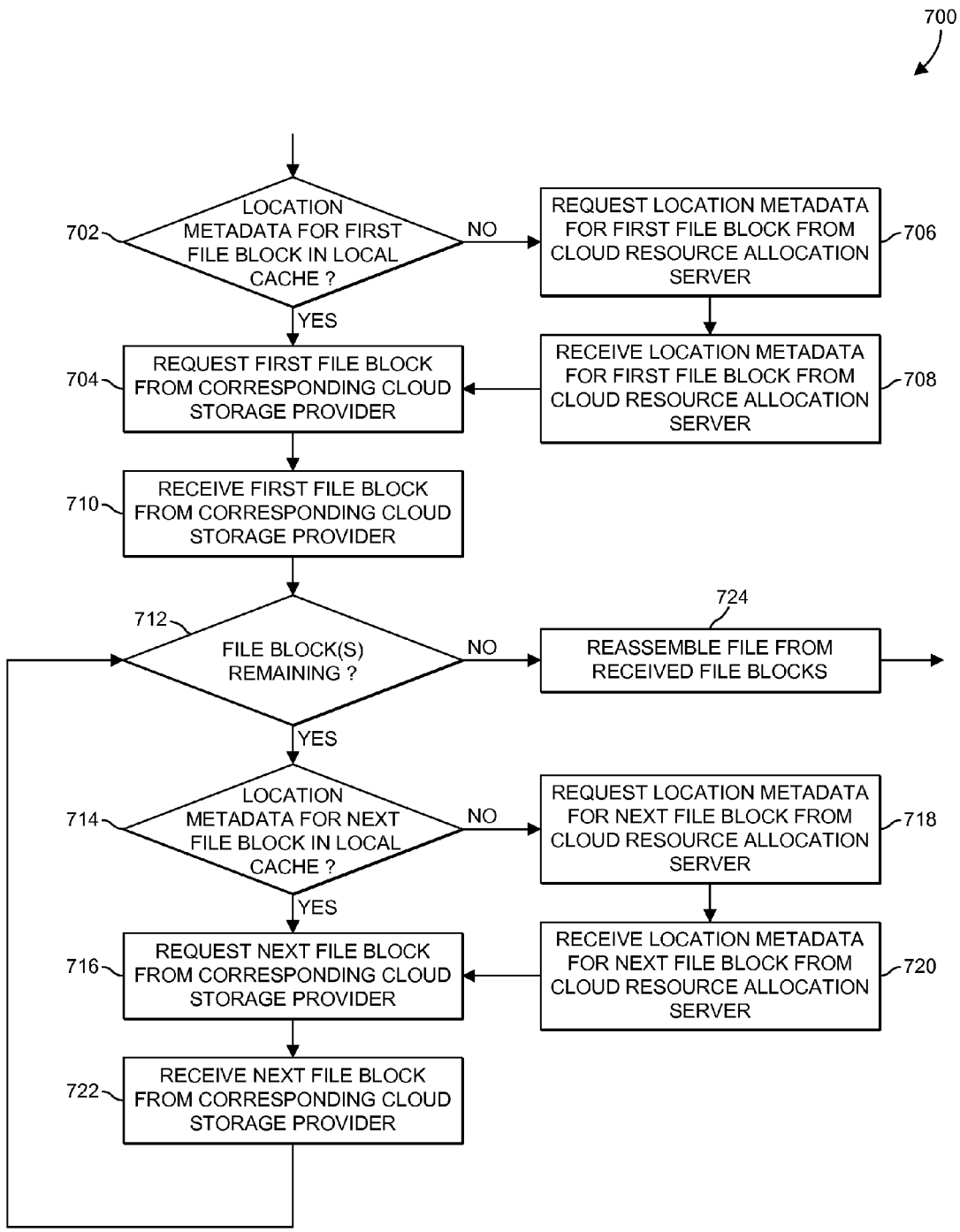
FIG. 7 is a simplified flow diagram of at least one embodiment of a method that may be executed by the client computing device of FIGS. 1 and 3 for retrieving data striped across multiple storage clouds.

Referring now to FIG. 7, in use, the client computing device 110 may execute a method 700 for retrieving data striped across multiple cloud storage providers 150. The method 700 begins with block 702 in which the client computing device 110 determines which of the cloud storage providers 150 a first file block (e.g., an initial file block) of a particular file to be retrieved is stored. To do so, the client computing device 110 determines, at block 702, whether location metadata corresponding to the first file block is stored in the local metadata storage cache 120. If, at block 702, the client computing device 110 determines that the location metadata corresponding to the first file block is stored in the local metadata storage cache 120, the method 700 advances to block 704. If, however, the client computing device 110 instead determines at block 702 that the location metadata is not stored in the local metadata storage cache 120 (or is otherwise outdated), the method 700 advances to block 706.

Figure 8:
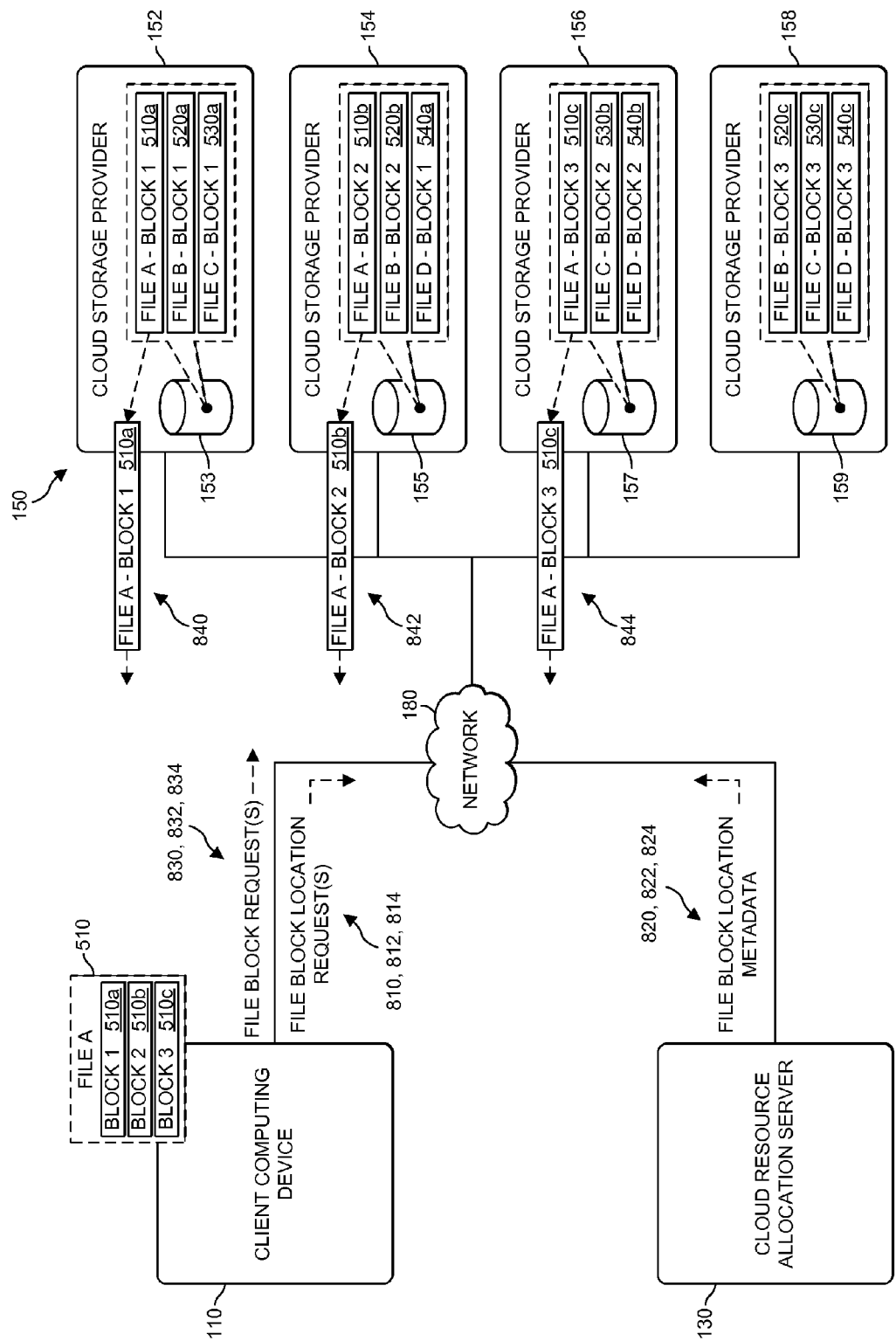
FIG. 8 is a simplified block diagram illustrating at least one embodiment of data retrieval of data striped across multiple storage clouds by executing the method of FIG. 7.

At block 706, the client computing device 110 requests the location metadata corresponding to the first file block from the cloud resource allocation server 130. For example, in embodiments such as the one illustratively shown in FIG. 8, the client computing device 110 sends a request 810 to the cloud resource allocation server 130 for the location metadata corresponding to the first file block. Referring back to FIG. 7, after sending the cloud resource allocation server 130 the request for the location metadata corresponding to the first file block, the method 700 advances to block 708.

At block 708, the client computing device 110 receives the requested location metadata for the first file block. For example, in embodiments such as the one illustratively shown in FIG. 8, the client computing device 110 receives the requested location metadata for the first file block 820 from the cloud resource allocation server 130. Referring back to FIG. 7, after receiving the location metadata corresponding to the first file block from the cloud resource allocation server 130, the method 700 advances to block 704.

At block 704, the client computing device 110 requests that the first file block be sent from the one or more cloud storage providers 150 identified from the location metadata as storing the first file block. For example, referring to the illustrative embodiment shown in FIG. 8, the client computing device 110 may request 830 that the first file block of a particular file (e.g., File A—Block 1 510*a*) be sent from the cloud storage provider 152, which was identified from the location metadata as one of the cloud storage providers 150 storing the first file block (e.g., File A—Block 1 510*a*). Referring back to FIG. 7, after requesting that the first file block be sent from the corresponding one or more cloud storage providers 150, the method 700 advances to block 710.

At block 710, the client computing device 110 receives the first file block from the corresponding one or more cloud storage providers 150. For example, referring again to the illustrative embodiment shown in FIG. 8, the client computing device 110 may receive 840 the first file block (e.g., File A—Block 1 510*a*) from the cloud storage provider 152 identified in the location metadata. Referring back to FIG. 7, after receiving the first file block from the one or more cloud storage providers 150 identified in the location metadata, the method 700 advances to block 712.

At block 712, the client computing device 110 determines whether there are any file blocks still remaining to be retrieved from one or more of the cloud storage providers 150. In some embodiments, the client computing device 110 may determine whether there are any file blocks still remaining to be retrieved based at least in part on, or otherwise as a function of, re-assembly metadata. If, at block 712, it is determined that there are file blocks of the particular file still remaining to be retrieved from one or more of the cloud storage providers 150, the method 700 advances to block 714.

At block 714, the client computing device 110 determines which of the cloud storage providers 150 the next file block of the particular file to be retrieved is stored. To do so, the client computing device 110 determines, at block 714, whether the location metadata corresponding to the next file block is stored in the local metadata storage cache 120. If, at block 714, the client computing device 110 determines that the location metadata corresponding to the next file block is stored in the local metadata storage cache 120, the method 700 advances to block 716. If, however, the client computing device 110 determines at block 714 that the location metadata for the next file block is not stored in the local metadata storage cache 120, the method 700 advances instead to block 718.

At block 718, the client computing device 110 requests the location metadata corresponding to the next file block from the cloud resource allocation server 130. For example, in embodiments such as the one illustratively shown in FIG. 8, the client computing device 110 sends a request 812, 814 to the cloud resource allocation server 130 for the location metadata corresponding to the next file block. Referring back to FIG. 7, after sending the cloud resource allocation server 130 the request for the location metadata corresponding to the next file block, the method 700 advances to block 720.

At block 720, the client computing device 110 receives the requested location metadata for the next file block. For example, in embodiments such as the one illustratively shown in FIG. 8, the client computing device 110 receives the requested location metadata for the next file block 822, 824 from the cloud resource allocation server 130. Referring back to FIG. 7, after receiving the location metadata corresponding to the next file block from the cloud resource allocation server 130, the method 700 advances to block 716.

At block 716, the client computing device 110 requests that the next file block be sent from the one or more cloud storage providers 150 identified from the location metadata as storing the next file block. For example, referring to the illustrative embodiment shown in FIG. 8, the client computing device 110 may request 832, 834 that the next file block of a particular file (e.g., File A—Block 2 510*b* or File A—Block 3 510*c*) be sent from the cloud storage provider 154, 156, which was identified from the location metadata as one of the cloud storage providers 150 storing the next file block (e.g., File A—Block 2 510*b* or File A—Block 3 510*c*). Referring back to FIG. 7, after requesting that the next file block be sent from the corresponding one or more cloud storage providers 150, the method 700 advances to block 722.

At block 722, the client computing device 110 receives the next file block from the corresponding one or more cloud storage providers 150. For example, referring again to the illustrative embodiment shown in FIG. 8, the client computing device 110 may receive 842, 844 the next file block (e.g., File A—Block 2 510*b* or File A—Block 3 510*c*) from the cloud storage provider 154, 156 identified in the location metadata. Referring back to FIG. 7, after receiving the next file block from the one or more cloud storage providers 150 identified in the location metadata, the method 700 returns to block 712 to determine whether there are any file blocks still remaining to be retrieved from one or more of the cloud storage providers 150.

Returning to block 712, if it is determined that there are not any file blocks of the particular file still remaining to be retrieved from one or more of the cloud storage providers 150, the method 700 advances to block 724 in which the client computing device 110 re-assembles the file using each of the file blocks received from the one or more cloud storage providers 150. As discussed, the client computing device 110 may re-assemble a plurality of file blocks into a particular file (e.g., File A 510 as illustratively shown in FIGS. 5 and 8) using re-assembly metadata corresponding to the file to be re-assembled. In some embodiments, the client computing device 110 may retrieve the re-assembly metadata from the local metadata storage cache 120. Additionally or alternatively, the client computing device 110 may request that the re-assembly metadata be sent from the cloud resource allocation server 130. It should also be appreciated that although the client computing device 110 re-assembles a particular file using each of the file blocks received from the one or more cloud storage providers 150 in the illustrative embodiment, the client computing device 110 may receive the re-assembled file from the cloud resource allocation server 130 in other embodiments. For example, in some embodiments, the cloud resource allocation server 130 may retrieve each of the file blocks from the one or more cloud storage providers 150 and re-assemble the file. In such embodiments, the re-assembled file may then be sent to the client computing device 110.

EXAMPLES

Illustrative examples of the devices, systems, and methods disclosed herein are provided below. An embodiment of the devices, systems, and methods may include any one or more, and any combination of, the examples described below.

Example 1 includes a cloud resource allocation server for adaptively striping data across a plurality of storage clouds, the cloud resource allocation server including a communication module to receive (i) user constraints corresponding one or more cloud storage providers and (ii) a file to be striped across the one or more cloud storage providers; and a block allocation module to (i) split the received file into a plurality of file blocks and (ii) allocate each of the plurality of file blocks to a cloud storage provider of the one or more cloud storage providers as a function of the user constraints and operating conditions of each of the one or more cloud storage providers, each of the plurality of file blocks being allocated to a different cloud storage provider, wherein the communication module further to send each of the plurality of file blocks to the cloud storage provider to which each file block is allocated.

Example 2 includes the subject matter of Example 1, and wherein the block allocation module further to store location metadata for each of the plurality file blocks, the location metadata for each file block identifying which of the one or more cloud storage providers the file block is allocated and stored.

Example 3 includes the subject matter of Examples 1 and 2, and wherein the block allocation module further to store re-assembly metadata for re-assembling the file from each of the plurality of file blocks.

Example 4 includes the subject matter of Examples 1-3, and wherein the block allocation module further to replicate each allocated file block to another cloud storage provider, the another cloud storage provider being different from the cloud storage provider to which each file block is allocated.

Example 5 includes the subject matter of Examples 1-4, and wherein the block allocation module further to replicate the location metadata for each of the plurality file blocks another cloud resource allocation server.

Example 6 includes the subject matter of Examples 1-5, and further including a change detection module to monitor for changes to the user constraints and the operating conditions of each of the one or more cloud storage providers, and wherein the block allocation module further to (i) determine whether to re-allocate one or more of the plurality of file blocks allocated to one cloud storage provider to another cloud storage provider in response to the change detection module detecting a change to one or more of the user constraints and the operating conditions of the one storage provider, (ii) re-allocate one or more of the plurality of file blocks from the one cloud storage provider to the another cloud storage provider in response to determining to re-allocate the one or more of the plurality of file blocks, and (iii) update the location metadata for each of the plurality file blocks re-allocated from the one cloud storage provider to the another cloud storage provider.

Example 7 includes the subject matter of Examples 1-6, and wherein the user constraints include an availability preference, a performance level preference, and a cost preference of which each of the one or more cloud storage providers must satisfy to be allocated one or more of the plurality of file blocks, and wherein to allocate each of the plurality of file blocks to a cloud storage provider of the one or more cloud storage providers as a function of the user constraints and the operating conditions of each of the one or more cloud storage providers includes to allocate each of the plurality of file blocks to a cloud storage provider of the one or more cloud storage providers in response to determining that the cloud storage provider satisfies the availability preference, the performance level preference, and the cost preference.

Example 8 includes the subject matter of Examples 1-7, and wherein to determine whether to re-allocate one or more of the plurality of file blocks allocated to one cloud storage provider to another cloud storage provider in response to detecting a change to one or more of the user constraints and the operating conditions of the one storage provider includes to determine whether to re-allocate one or more of the plurality of file blocks allocated to one cloud storage provider to another cloud storage provider in response to determining that the operating conditions of the one storage provider no longer satisfy one or more of the availability preference, the performance level preference, and the cost preference.

Example 9 includes a method for adaptively striping data across a plurality of storage clouds, the method including receiving, on a cloud resource allocation server, user constraints corresponding one or more cloud storage providers; receiving, on the cloud resource allocation server, a file to be striped across the one or more cloud storage providers; splitting, on the cloud resource allocation server, the received file into a plurality of file blocks; allocating, on the cloud resource allocation server, each of the plurality of file blocks to a cloud storage provider of the one or more cloud storage providers as a function of the user constraints and operating conditions of each of the one or more cloud storage providers, each of the plurality of file blocks being allocated to a different cloud storage provider; and sending, on the cloud resource allocation server, each of the plurality of file blocks to the cloud storage provider to which each file block is allocated.

Example 10 includes the subject matter of Example 9, and further including storing, on the cloud resource allocation server, location metadata for each of the plurality file blocks, the location metadata for each file block identifying which of the one or more cloud storage providers the file block is allocated and stored.

Example 11 includes the subject matter of Examples 9 and 10, and further including storing, on the cloud resource allocation server, re-assembly metadata for re-assembling the file from each of the plurality of file blocks.

Example 12 includes the subject matter of Examples 9-11, and further including replicating, on the cloud resource allocation server, each allocated file block to another cloud storage provider, the another cloud storage provider being different from the cloud storage provider to which each file block is allocated.

Example 13 includes the subject matter of Examples 9-12, and further including replicating, on the cloud resource allocation server, the location metadata for each of the plurality file blocks on another cloud resource allocation server.

Example 14 includes the subject matter of Examples 9-13, and further including monitoring, on the cloud resource allocation server, for changes to the user constraints; monitoring, on the cloud resource allocation server, for changes to the operating conditions of each of the one or more cloud storage providers; determining, on the cloud resource allocation server, whether to re-allocate one or more of the plurality of file blocks allocated to one cloud storage provider to another cloud storage provider in response to detecting a change to one or more of the user constraints and the operating conditions of the one storage provider; re-allocating, on the cloud resource allocation server, one or more of the plurality of file blocks from the one cloud storage provider to the another cloud storage provider in response to determining to re-allocate the one or more of the plurality of file blocks; and updating, on the cloud resource allocation server, the location metadata for each of the plurality file blocks re-allocated from the one cloud storage provider to the another cloud storage provider.

Example 15 includes the subject matter of Examples 9-14, and wherein the user constraints include an availability preference, a performance level preference, and a cost preference of which each of the one or more cloud storage providers must satisfy to be allocated one or more of the plurality of file blocks, and wherein allocating each of the plurality of file blocks to a cloud storage provider of the one or more cloud storage providers as a function of the user constraints and the operating conditions of each of the one or more cloud storage providers includes allocating each of the plurality of file blocks to a cloud storage provider of the one or more cloud storage providers in response to determining that the cloud storage provider satisfies the availability preference, the performance level preference, and the cost preference.

Example 16 includes the subject matter of Examples 9-15, and wherein determining whether to re-allocate one or more of the plurality of file blocks allocated to one cloud storage provider to another cloud storage provider in response to detecting a change to one or more of the user constraints and the operating conditions of the one storage provider includes determining whether to re-allocate one or more of the plurality of file blocks allocated to one cloud storage provider to another cloud storage provider in response to determining that the operating conditions of the one storage provider no longer satisfy one or more of the availability preference, the performance level preference, and the cost preference.

Example 17 includes a cloud resource allocation server for adaptively striping data across a plurality of storage clouds, the cloud resource allocation server including a processor; and a memory having stored therein a plurality of instructions that when executed by the processor cause the cloud resource allocation server to perform the method of any of Examples 9-16.

Example 18 includes one or more machine readable media including a plurality of instructions stored thereon that in response to being executed result in a cloud resource allocation server performing the method of any of Examples 9-16.

Example 19 includes a computing device for re-assembling a file from a plurality of file blocks striped across a plurality of storage clouds, the computing device including a block location determination module to (i) determine that a first cloud storage provider of a plurality of cloud storage providers is storing a first file block of a particular file to be re-assembled, and (ii) determine that a second cloud storage provider of a plurality of cloud storage providers is storing a second file block of the particular file to be re-assembled; a file re-assembly module to (i) request the first file block from the first cloud storage provider, and (ii) request the second file block from the second cloud storage provider; a communication module to (i) receive the first file block from the first cloud storage provider, and (ii) receive the second file block from the second cloud storage provider; and the file re-assembly module further to re-assemble the particular file to be re-assembled from the received first and second file blocks.

Example 20 includes the subject matter of Example 19, and wherein the file re-assembly module further to determine whether the second file block of the particular file to be re-assembled exists.

Example 21 includes the subject matter of Examples 19 and 20, and wherein the block location determination module further to determine whether location metadata corresponding to the first file block is stored in a local metadata storage of the computing device; and determine whether location metadata corresponding to the second file block is stored in the local metadata storage of the computing device.

Example 22 includes the subject matter of Examples 19-21, and wherein the block location determination module further to request the location metadata corresponding to the first file block from a cloud resource allocation server in response to determining that the location metadata corresponding to the first file block is not stored in the local metadata storage of the computing device; and request the location metadata corresponding to the second file block from the cloud resource allocation server in response to determining that the location metadata corresponding to the second file block is not stored in the local metadata storage of the computing device.

Example 23 includes the subject matter of Examples 19-22, and wherein to determine that a first cloud storage provider of a plurality of cloud storage providers is storing a first file block of a particular file to be re-assembled includes to determine that a first cloud storage provider of a plurality of cloud storage providers is storing a first file block of a particular file to be re-assembled as a function of the location metadata corresponding to the first file block, and wherein to determine that a second cloud storage provider of a plurality of cloud storage providers is storing the second file block includes to determine that a second cloud storage provider of a plurality of cloud storage providers is storing the second file block as a function of the location metadata corresponding to the second file block.

Example 24 includes the subject matter of Examples 19-23, and wherein the file reassembly module further to determine whether re-assembly metadata corresponding to the particular file to be re-assembled is stored in the local metadata storage of the computing device.

Example 25 includes the subject matter of Examples 19-24, and wherein the file reassembly module further to request the re-assembly metadata corresponding to the particular file to be re-assembled from a cloud resource allocation server in response to determining that the re-assembly metadata corresponding to the particular file to be re-assembled is not stored in the local metadata storage of the computing device.

Example 26 includes the subject matter of Examples 19-25, and wherein to re-assemble the particular file to be re-assembled from the received first and second file blocks includes to re-assemble the particular file to be re-assembled from the received first and second file blocks as a function of the re-assembly metadata.

Example 27 includes a method for re-assembling a file from a plurality of file blocks striped across a plurality of storage clouds, the method including determining, on the computing device, that a first cloud storage provider of a plurality of cloud storage providers is storing a first file block of a particular file to be re-assembled; requesting, on the computing device, the first file block from the first cloud storage provider; receiving, on the computing device, the first file block from the first cloud storage provider; determining, on the computing device, whether a second file block of the particular file to be re-assembled exists; determining, on the computing device, that a second cloud storage provider of a plurality of cloud storage providers is storing the second file block in response to determining that the second filed block of the particular file to be re-assembled exists; requesting, on the computing device, the second file block from the second cloud storage provider; receiving, on the computing device, the second file block from the second cloud storage provider; and re-assembling, on the computing device, the particular file to be re-assembled from the received first and second file blocks.

Example 28 includes the subject matter of Example 27, and further including determining, on the computing device, whether location metadata corresponding to the first file block is stored in a local metadata storage of the computing device; and determining, on the computing device, whether location metadata corresponding to the second file block is stored in the local metadata storage of the computing device.

Example 29 includes the subject matter of Examples 27 and 28, and further including requesting, on the computing device, the location metadata corresponding to the first file block from a cloud resource allocation server in response to determining that the location metadata corresponding to the first file block is not stored in the local metadata storage of the computing device; and requesting, on the computing device, the location metadata corresponding to the second file block from the cloud resource allocation server in response to determining that the location metadata corresponding to the second file block is not stored in the local metadata storage of the computing device.

Example 30 includes the subject matter of Examples 27-29, and wherein determining that a first cloud storage provider of a plurality of cloud storage providers is storing a first file block of a particular file to be re-assembled includes determining that a first cloud storage provider of a plurality of cloud storage providers is storing a first file block of a particular file to be re-assembled as a function of the location metadata corresponding to the first file block, and wherein determining that a second cloud storage provider of a plurality of cloud storage providers is storing the second file block includes determining that a second cloud storage provider of a plurality of cloud storage providers is storing the second file block as a function of the location metadata corresponding to the second file block.

Example 31 includes the subject matter of Examples 27-30, and further including determining, on the computing device, whether re-assembly metadata corresponding to the particular file to be re-assembled is stored in the local metadata storage of the computing device.

Example 32 includes the subject matter of Examples 27-31, and further including requesting, on the computing device, the re-assembly metadata corresponding to the particular file to be re-assembled from a cloud resource allocation server in response to determining that the re-assembly metadata corresponding to the particular file to be re-assembled is not stored in the local metadata storage of the computing device.

Example 33 includes the subject matter of Examples 27-32, and wherein re-assembling the particular file to be re-assembled from the received first and second file blocks includes re-assembling the particular file to be re-assembled from the received first and second file blocks as a function of the re-assembly metadata.

Example 34 includes a computing device for adaptively striping data across a plurality of storage clouds, the computing device including a processor; and a memory having stored therein a plurality of instructions that when executed by the processor cause the computing device to perform the method of any of Examples 27-33.

Example 35 includes one or more machine readable media including a plurality of instructions stored thereon that in response to being executed result in a computing device performing the method of any of Examples 27-33.

The invention claimed is:

1. A cloud resource allocation server for adaptively striping data across a plurality of storage clouds, the cloud resource allocation server comprising:
   a communication hardware module to receive (i) user constraints corresponding one or more of a plurality of cloud storage providers and (ii) a file to be striped across the plurality of cloud storage providers;
   a block allocation hardware module to (i) split the received file into a plurality of file blocks as a function of the user constraints and (ii) allocate each of the plurality of file blocks to a cloud storage provider of the plurality of cloud storage providers as a function of the user constraints and operating conditions of each of the plurality of cloud storage providers, each of the plurality of file blocks being allocated to a different cloud storage provider, (iii) store location metadata for each of the plurality file blocks, wherein the location metadata for each file block identifies the cloud storage provider of the plurality of cloud storage providers to which the respective file block is allocated and stored, (iv) replicate the location metadata for each of the plurality of file blocks to another cloud resource allocation server, and (v) store re-assembly metadata for re-assembling the file from each of the plurality of file blocks;
   a change detection hardware module to detect a change to the operating conditions of a first cloud storage provider of the plurality of cloud storage providers storing a file block of the plurality of file blocks;
   wherein the communication hardware module is further to send each of the plurality of file blocks to the cloud storage provider to which each file block is allocated to be stored; and
   wherein the block allocation hardware module is further to (i) reallocate the stored file block from the first cloud storage provider to a second cloud storage provider of the plurality of cloud storage providers in response to a determination that the changed operating conditions of the first cloud storage service provider no longer satisfy the user constraints and (ii) update the location metadata for the file block reallocated from the first cloud storage provider to the second cloud storage provider.

2. The cloud resource allocation server of claim 1, wherein the block allocation module hardware further to replicate each allocated file block to another cloud storage provider, the another cloud storage provider being different from the cloud storage provider to which each file block is allocated.

3. The cloud resource allocation server of claim 1, wherein the user constraints comprise an availability preference, a performance level preference, and a cost preference of which each of the plurality of cloud storage providers must satisfy to be allocated one or more of the plurality of file blocks, and
   wherein to allocate each of the plurality of file blocks to a cloud storage provider of the plurality of cloud storage providers as a function of the user constraints and the operating conditions of each of the plurality of cloud storage providers comprises to allocate each of the plurality of file blocks to a cloud storage provider of the plurality of cloud storage providers in response to determining that the cloud storage provider satisfies the availability preference, the performance level preference, and the cost preference.

4. The cloud resource allocation server of claim 3, wherein to reallocate the stored file block from the first cloud storage provider to the second cloud storage provider comprises to reallocate the stored file block from the first cloud storage provider to the second cloud storage provider in response to a determination that the changed operating conditions of the first cloud storage provider no longer satisfy one or more of the availability preference, the performance level preference, and the cost preference.

5. A method for adaptively striping data across a plurality of storage clouds, the method comprising:
   receiving, by a cloud resource allocation server, user constraints corresponding one or more of a plurality of cloud storage providers;
   receiving, by the cloud resource allocation server, a file to be striped across the plurality of cloud storage providers;
   splitting, by the cloud resource allocation server, the received file into a plurality of file blocks as a function of the user constraints;
   allocating, by the cloud resource allocation server, each of the plurality of file blocks to a cloud storage provider of the plurality of cloud storage providers as a function of the user constraints and operating conditions of each of the plurality of cloud storage providers, each of the plurality of file blocks being allocated to a different cloud storage provider;
   sending, by the cloud resource allocation server, each of the plurality of file blocks to the cloud storage provider to which each file block is allocated to be stored;
   storing, by the cloud resource allocation server, location metadata for each of the plurality file blocks, the location metadata for each file block identifying the cloud storage provider of the plurality of cloud storage providers to which the respective file block is allocated and stored;
   replicating, by the cloud resource allocation server, the location metadata for each of the plurality of file blocks to another cloud resource allocation server;
   storing, by the cloud resource allocation server, re-assembly metadata for re-assembling the file from each of the plurality of file blocks;
   detecting, by the cloud resource allocation server, a change to the operating conditions of a first cloud storage provider of the plurality of cloud storage providers storing a file block of the plurality of file blocks;
   reallocating, by the cloud resource allocation server, the stored file block from the first cloud storage provider to a second cloud storage provider of the plurality of cloud storage providers in response to a determination that the changed operating conditions of the first cloud storage service provider no longer satisfy the user constraints; and
   updating, by the cloud resource allocation server, the location metadata for the file block reallocated from the first cloud storage provider to the second cloud storage provider.

6. The method of claim 5, further comprising:
   replicating, by the cloud resource allocation server, each allocated file block to the another cloud storage provider, the another cloud storage provider being different from the cloud storage provider to which each file block is allocated.

7. The method of claim 5, wherein the user constraints comprise an availability preference, a performance level preference, and a cost preference of which each of the plurality of cloud storage providers must satisfy to be allocated one or more of the plurality of file blocks, and
   wherein allocating each of the plurality of file blocks to a cloud storage provider of the plurality of cloud storage providers as a function of the user constraints and the operating conditions of each of the plurality of cloud storage providers comprises allocating each of the plurality of file blocks to a cloud storage provider of the plurality of cloud storage providers in response to determining that the cloud storage provider satisfies the availability preference, the performance level preference, and the cost preference.

8. The method of claim 7, wherein reallocating the stored file block from the first cloud storage provider to the second cloud storage provider comprises reallocating the stored file block from the first cloud storage provider to the second cloud storage provider in response to a determination that the changed operating conditions of the first cloud storage provider no longer satisfy one or more of the availability preference, the performance level preference, and the cost preference.

9. One or more non-transitory machine-readable media comprising a plurality of instructions stored thereon that in response to being executed result in a cloud resource allocation server:
   receiving user constraints corresponding one or more of a plurality of cloud storage providers;
   receiving a file to be striped across the plurality of cloud storage providers;
   splitting the received file into a plurality of file blocks as a function of the user constraints;
   allocating each of the plurality of file blocks to a cloud storage provider of the plurality of cloud storage providers as a function of the user constraints and operating conditions of each of the plurality of cloud storage providers, each of the plurality of file blocks being allocated to a different cloud storage provider;
   sending each of the plurality of file blocks to the cloud storage provider to which each file block is allocated;
   storing location metadata for each of the plurality file blocks, the location metadata for each file block identifying the cloud storage provider of the plurality of cloud storage providers to which the respective file block is allocated and stored;
   replicating the location metadata for each of the plurality of file blocks to another cloud resource allocation server;
   storing re-assembly metadata for re-assembling the file from each of the plurality of file blocks;
   detecting a change to the operating conditions of a first cloud storage provider of the plurality of cloud storage providers storing a file block of the plurality of file blocks;
   reallocating the stored file block from the first cloud storage provider to a second cloud storage provider of the plurality of cloud storage providers in response to a determination that the changed operating conditions of the first cloud storage service provider no longer satisfy the user constraints; and
   updating the location metadata for the file block reallocated from the first cloud storage provider to the second cloud storage provider.

10. The one or more non-transitory machine-readable media of claim 9, wherein the user constraints comprise an availability preference, a performance level preference, and a cost preference of which each of the plurality of cloud storage providers must satisfy to be allocated one or more of the plurality of file blocks;
   wherein allocating each of the plurality of file blocks to a cloud storage provider of the plurality of cloud storage providers as a function of the user constraints and the operating conditions of each of the plurality of cloud storage providers comprises allocating each of the plurality of file blocks to a cloud storage provider of the plurality of cloud storage providers in response to determining that the cloud storage provider satisfies the availability preference, the performance level preference, and the cost preference; and
   wherein reallocating the stored file block from the first cloud storage provider to the second cloud storage provider comprises reallocating the stored file block from the first cloud storage provider to the second cloud storage provider in response to a determination that the changed operating conditions of the first cloud storage provider no longer satisfy one or more of the availability preference, the performance level preference, and the cost preference.

\* \* \* \* \*